Feb. 26, 1957

B. C. SHINN 2,782,529

ENUNCIATING TELESCOPE

Filed March 28, 1955

INVENTOR.
B. Claude Shinn
BY
ATTORNEY.

United States Patent Office 2,782,529
Patented Feb. 26, 1957

2,782,529
ENUNCIATING TELESCOPE
B. Claude Shinn, Norman, Okla.

Application March 28, 1955, Serial No. 497,351

3 Claims. (Cl. 35—43)

This invention relates generally to the field of instruments for use by the public in viewing natural phenomena and, more particularly, to improved, coin operated, optical viewing assemblies incorporating therein means for audibly informing a person using the assembly of the nature of the phenomena which he is viewing through the optical portion thereof.

The average member of the public, when viewing astronomical, geographical, microscopic or similar natural phenomena with which he is not already familiar through an optical instrument does not know exactly what to look for or the significance of all that he could see. Consequently, he is likely to fail to appreciate the nature or significance of a large portion of the scene that he is viewing. If his visual inspection of the scene, view or objects can be accompanied by a simultaneous oral explanation of the phenomena being viewed, the value and enjoyment to the viewer of the experience is greatly enhanced.

Accordingly, it is the primary object of this invention to provide, in combination, optical structure for viewing natural phenomena and means for advising or enunciating to him simultaneously with his viewing of such phenomena an oral exposition of the nature and significance of such phenomena.

It is another important object of this invention to provide such structure which includes coin operated means for controlling the operation or availability to a potential user of both the optical viewing portion and the explanation enunciating portion of the structure.

It is another important object of this invention to provide a plurality of such structures having their optical portions arranged in different predetermined dispositions for viewing different aspects of a given phenomenon and each provided with enunciating means adapted to explain the particular part of the phenomenon which may be observed through the optical portion of each particular one of said plurality of structures.

Still other important objects of this invention, including certain important details of construction, will be made clear or become apparent as the following explanation of the invention progresses.

Figure 1:
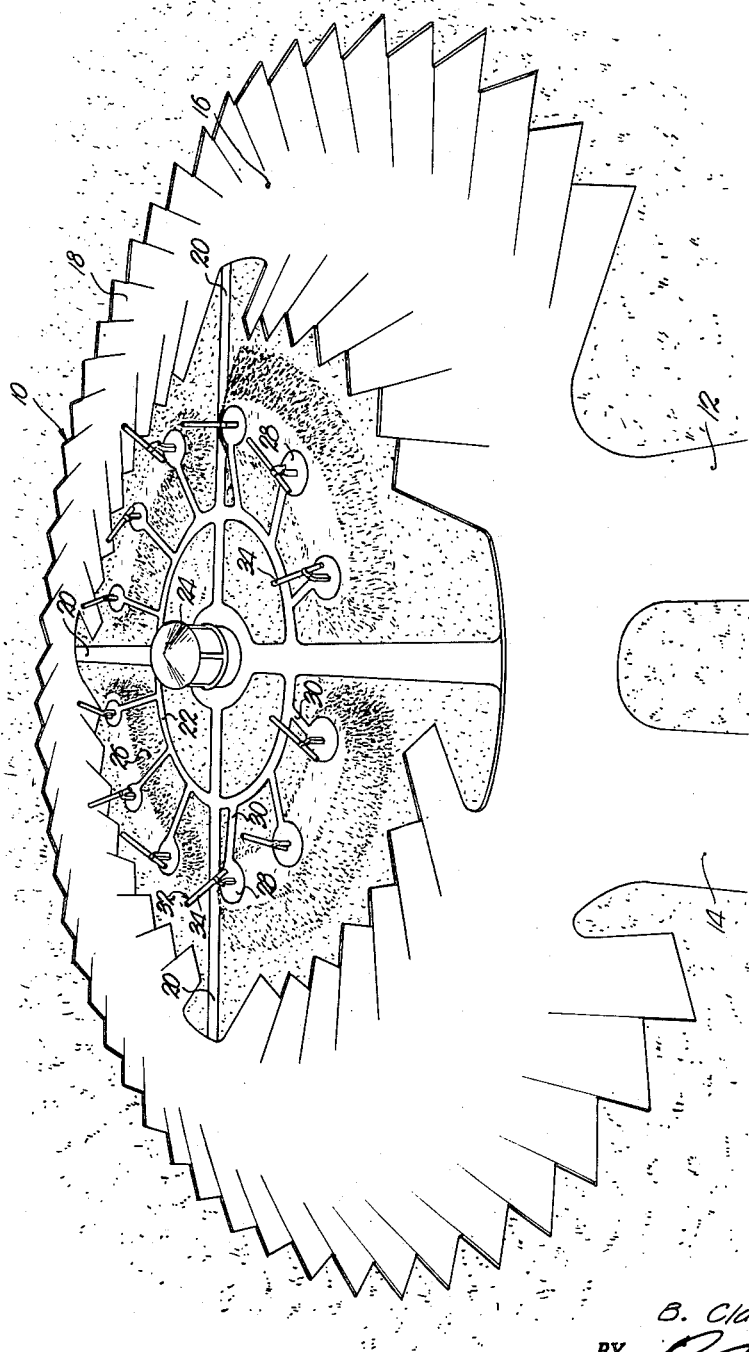
Figure 1 is a perspective view of a convenient arrangement or layout of a plurality of structures made and disposed in accordance with the teachings of the invention for providing an opportunity to the general public to view different portions of an astronomical phenomenon.

Referring first to Fig. 1, there is illustrated an installation generally designated 10 suitable for the convenience of the public in enjoying the benefits of this invention. An ingress roadway 12 and an egress roadway 14 lead to a parking slab 16 having a number of individual parking places 18 arranged thereabout, the slab 16 preferably being substantially annular. A number of radial walkways 20 lead to an inner, annular walkway 22 and to a shelter house 24 disposed centrally of slab 16 and walkway 22 in which refreshments may be offered, if desired. The ground surrounding walkway 20 is preferably terraced as at 26 to provide raised positions for a plurality of angularly spaced viewing sites 28 arranged substantially in a circle between walkway 22 and slab 16 and connected with walkway 22 by individual, radial paths 30. On each of the sites 28 is disposed an enunciating viewing assembly 32 made in accordance with this invention. The optical structures 34 forming a part of the assemblies 32 are preferably differently disposed for viewing different aspects of a natural phenomenon, for instance in Fig. 1, the assemblies 32 are illustrated as including astronomical telescopes as their optical structures 34, and such telescopes or structures 34 are differently disposed so that a viewer may observe a different portion of the heavens from each site 28.

Figure 2:
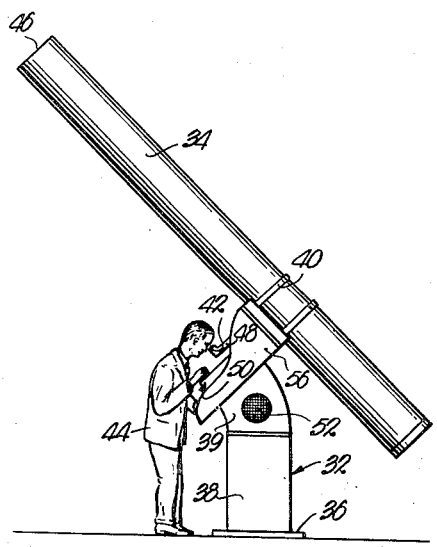
Fig. 2 is a perspective view of one of the structures per se, showing a user during utilization of the structure.

Referring next to Fig. 2, each assembly 32 will be seen to include a base 36 having a hollow housing 38 mounted thereon upon which is supported by any suitable means 40 the optical structure 34 of the assembly, which in the illustrated case, comprises an astronomical telescope having an eye piece 42 into which an observer 44 may look to see a magnified image of that portion of the heavens within the scope of an inlet end 46 of telescope structure 34, it being noted that the eye piece 42 is optically coupled with the telescope structure 34 through a viewing tube 48. Also visible in Fig. 2 is a coin mechanism box generally designated 50 adapted to receive the deposit of a coin and containing switching means hereinafter to be identified; and a grill 52 for a loud speaker within housing 38, which will also be further hereinafter identified. It is to be further understood that other operative parts of the assembly 32, including the controlled means hereinafter to be described may be conveniently installed within the hollow housing 38. Further, in this connection, it is pointed out that a shutter 54 (shown only in Fig. 3) is provided and disposed for masking or closing the viewing tube 48, except when such shutter 54 has been operated to a retracted position responsive to the deposit of a coin within mechanism 50. Such shutter 54, although not shown in Fig. 2, will be understood to be installed within an upper portion 56 of housing 38, which is preferably formed to give the general appearance of an operating board or panel. Finally, it is noted that an upper portion of the housing 38 is preferably shiftable relative to the remainder of the latter in assemblies 32 for viewing astronomical phenomena, and that means (not shown) may be provided within housing 38 for automatically shifting portion 39 to compensate for rotation of the earth, so that the optical structure or telescope 34 will automatically track the phenomena to be observed.

Figure 3:
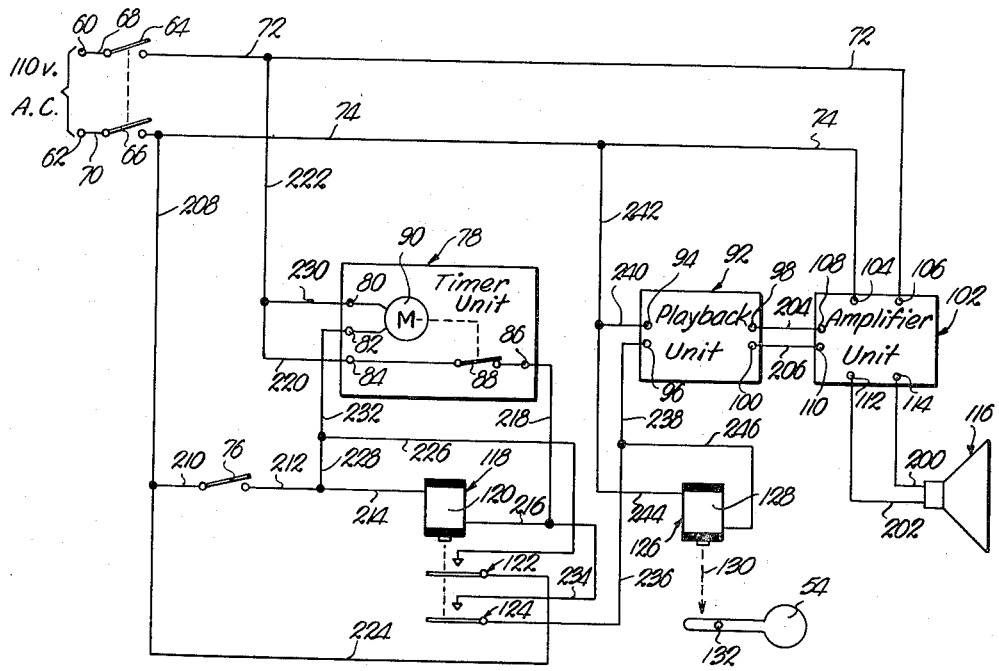
Fig. 3 is a schematic, partially block diagram of the enunciating and control portions of the structure.

Referring next to Fig. 3, a pair of terminals 60 and 62 indicate a connection with any conventional power source, such as a 110 volt alternating current power line. Normally open ganged, main power switches 64 and 66 are connected with terminals 60 and 62 respectively by conductors 68 and 70. Switch 64 leads to one side 72 and switch 66 leads to the other side 74 of the power circuit for the portions of the assembly 38 now to be described. It will be understood that switches 64 and 66 will be closed by an operator of the installation 10 upon opening same for use by the public and will be opened or broken at the time of shutting down the installation 10.

The numeral 76 designates the normally open coin switch forming a part of mechanism 50, which is adapted to be momentarily closed by the deposit of coin within mechanism 50 and to thereafter open of its own accord.

The numeral 78 generally designates an electrical timer unit having a pair of control terminals 80 and 82 and a pair of controlled terminals 84 and 86. Timer unit 78 is preferably of the type including a normally close, single pole, single throw switch 88 coupled between controlled terminals 84 and 86 and an electrically responsive device 90 such as a motor or the like mechanically coupled with the switch 88 for momentarily opening the latter at the termination of some predetermined period of time.

A playback unit generally designated 92 is provided with energizing terminals 94 and 96 and with audio output terminals 98 and 100, it being understood that unit 92 can be of any conventional nature such as a tape or wire recording playback unit capable of responding to electrical energization of its terminals 94 and 96 to produce an audio output at terminals 98 and 100 corresponding to material theretofore recorded upon a tape, wire, record or the like. The numeral 102 generally designates an audio amplifier unit of conventional character having energizing terminals 104 and 106, audio input terminals 108 and 110 and audio output terminals 112 and 114. The numeral 116 generally designates a loud speaker.

A relay generally designated 118 is provided and includes a coil 120 and a pair of normally open, single pole, single throw switches 122 and 124 adapted to close when the coil 120 is energized. The numeral 126 generally designates a solenoid having an operating coil 128 and a mechanical connection indicated by the dotted line 130 with shutter 54 which, as illustrated, may be swingably mounted for pivoting about a point 132 to move the shutter 54 out of position masking viewing tube 48 when the coil 128 is energized. Speaker 116 is coupled with output terminals 112 and 114 of amplifier unit 102 by conductors 200 and 202, and energization terminals 104 and 106 of amplifier unit 102 are directly coupled with power lines 72 and 74, it being understood that the unit 102 is preferably maintained constantly energized during the period that installation 10 is maintained in operation, in order that no "warm up time" will be required. The audio output from terminals 98 and 100 of playback unit 92 is coupled through conductors 204 and 206 with input terminals 108 and 110 of amplifier unit 102.

The coin switch 76, the coil 120 of relay 118 and the switch 88 of timer 78 are coupled in series between power lines 72 and 74 by conductors 208, 210, 212, 214, 216, 218, terminal 84, terminal 86 and conductors 220 and 222. A holding circuit for coil 120 of relay 118 is provided through normally open switch 122 by a circuit in parallel with coin switch 76 traceable from conductor 208 through a conductor 224, switch 122 and conductors 226 and 228 to conductor 214 and coil 120. An energizing circuit for device 90 of timer unit 78 is provided through switch 122 and may be traced from power line 72 through conductors 222 and 230 to terminal 80, then from terminal 82 through conductors 232 and 226, through switch 122 and conductors 224 and 208 to power line 74. An energizing circuit for playback unit 92 may be traced from power line 72 through conductors 222 and 220, terminal 84, switch 88, terminal 86, conductors 218 and 234, switch 124, conductors 236 and 238 to excitation terminal 96 of unit 92 and from excitation terminal 94 thereof through conductors 240 and 242 to power line 74. An excitation circuit for coil 128 and solenoid 126 is provided in parallel for that just traced for playback unit 92 by a conductor 244 coupled with conductor 242 and a conductor 246 coupled with conductor 236.

It will be understood that the switches 64 and 66 may be disposed in shelter house 24, if desired, that coil switch 76 will be disposed within mechanism 50, that shutter 54 will be disposed within portion 56 of housing 38, and that the remainder of the structure illustrated in Fig. 3 is preferably disposed within the hollow housing 38 of assembly 32 with the speaker 116 mounted behind coil 52 so that sounds emanating from the speaker 116 may be clearly heard by a user 34 of the assembly 32. It will also be appreciated that each of the telescope structures 34 is preferably installed or, after adjustment, locked in a fixed position upon the housing 38 so that a particular portion only of the heavens is viewed from each site 28. It will also be obvious that the playback unit 92 at each site 28 is provided with a tape, wire, record or the like having recorded thereon explanatory material relating to the particular part of the heavens to be observed through the telescope structure 34 disposed at that site 28. It will also be manifest to those skilled in the art that the general principles of this invention will apply equally well to installations 10 wherein the various telescope structures 34 are fixed in positions for viewing surrounding geographic terrain rather than astronomical phenomena or, for that matter, in comparable installations where microscopes, for instance, are utilized in place of the telescopes 34.

In operation, presuming the operator of the installation 10 has closed the main power switches 64 and 66, the amplifier unit 102 will be energized and maintained in readiness for amplifying and feeding to speaker 116 audio signals from the playback unit 92. Since energizing terminals 94 and 96 of playback unit 92 will ordinarily be coupled with a tape or record advancing motor or other mechanism (not shown) it will be appreciated that no output is actually fed to speaker 116 until playback unit 92 is energized. Upon deposit by a user 44 of a coin within mechanism 50 coin switch 76 will be momentarily closed to energize coil 120 of relay 118. Energization of relay 118 will close switch 122 thereby completing the above traced holding circuit for coil 120. Closure of switch 122 will also energize terminals 80 and 82 of timer unit 78 and commence the timing device 90 to operate. Energization of relay 118 also closes switch 124 to supply power to the playback unit 92 and shutter operating solenoid 126. The playback unit 92 then commences to play the tape, wire or record forming a part thereof which, in turn, enunciates a description of the phenomena which may be viewed through telescope structure 34 by means of the amplifier unit 102 and the speaker 116. Simultaneously, energization of solenoid 126 mechanically operates the shutter 54 out of its masking position so that the user 44 may observe the phenomena through telescope structure 34. The timer device 90 is preferably chosen or adjusted so as to coincide with the time of playing one complete explanation on the tape, wire or the like forming a part of playback unit 92, it being further understood that the latter is preferably of endless nature so that it will be repeated over and over upon successive energizations of playback unit 92. When such time allotted to the explanation and viewing period has elapsed, device 90 will momentarily open switch 88. This breaks the energizing circuit for coil 120 of relay 118 and the latter de-energizes opening switches 122 and 124. Momentary opening of switch 122 breaks the holding circuit for relay coil 120. Opening of switch 124 de-energizes the playback unit 92 and the shutter operating solenoid 126. Opening of switch 122 also de-energizes the device 90 and the latter automatically resets itself for another cycle of operation permitting switch 88 to return to its normally closed condition. The assembly 32 is then in readiness for a subsequent operation by another user 44 upon the deposit of another coin within the mechanism 50.

It will be appreciated that those parts of the control and enunciating portion of assembly 32 shown only in block diagram form may be of various conventional constructions which, in themselves, form no part of this invention.

It will now be obvious that the structure illustrated and described above is ideally suited for accomplishing the worthy objects and purposes stated for this invention.

It will be manifest that many minor changes, modifications and variations can be made from the precise structure disclosed, without materially departing from the true spirit and intention of the invention. Accordingly, it is desired that the invention shall be deemed limited only by the scope of the appended claims.

Having thus described the invention, what is claimed as new and desired to be secured by Letters Patent is:

1. In educational apparatus for public use, the combination of optical means for transmitting light along a predetermined optical path to produce and display a magnified image of a natural phenomenon to be observed; electrically responsive playback means for reproducing an audible explanation of said phenomenon; shiftable shutter structure operably associated with said optical means and normally disposed in blocking relationship to said path to screen said image from view; control means adapted upon actuation thereof for supplying electrical current to said playback means and for shifting the structure to a position clearing said path and exposing said image to view; a coin operable mechanism; and means operably coupling said mechanism with said control means for actuating the latter when a coin is deposited in said mechanism.

2. In the apparatus as set forth in claim 1, wherein said control means includes, timing means for automatically deactuating the control means after a predetermined period.

3. In the apparatus as set forth in claim 1, wherein said optical means comprises an astronomical telescope, and said shutter structure is located within the latter.

References Cited in the file of this patent

UNITED STATES PATENTS

| | | |
|---|---|---|
| 1,093,511 | Wheeler | Apr. 14, 1914 |
| 1,434,845 | Richardson | Nov. 7, 1922 |
| 1,912,226 | Sepin et al. | May 30, 1933 |
| 2,114,138 | Corsello | Apr. 12, 1938 |
| 2,321,402 | Margulis | June 8, 1943 |